2,838,429

ELECTROLYTE FOR STORAGE BATTERIES AND PROCESS FOR PRODUCING THE SAME

Charlie Asa Sanders, Arenas Valley, N. Mex.

No Drawing. Application June 28, 1954
Serial No. 439,910

1 Claim. (Cl. 136—154)

This invention relates to storage battery electrolytes and has particular reference to a novel electrolyte and to a process for making the same.

One of the principal objects of this invention is to provide novel electrolytes useful as additives in sulfuric acid storage batteries, as the sole electrolyte in such batteries, or as the electrolyte in storage batteries of the alkaline type, and a process for making the same.

Another object of this invention is to provide battery electrolytes which function to improve battery operation as well as to extend battery life.

Other objects and advantages of this invention it is believed will be readily apparent from the following detailed description of preferred embodiments thereof.

Briefly, this invention includes the discovery that novel battery electrolytes and additives may be produced by extracting acid materials from carbonaceous materials such as lignite coal, peat coal, bituminous coal, anthracite coal, graphite, charcoal and peat moss.

Example 1

As a specific example of the process of this invention, lignite coal was crushed to pass a 200 mesh screen and placed in an autoclave with water in the ratio of ten pounds of coal per gallon of water. The ratio preferably is maintained within the range of 2–20 pounds of coal or equivalent per gallon of water. Distilled water is preferred, although if desired, tap water may be used if the combined mineral content thereof does not exceed 1200 parts per million. The coal-water mixture was heated to 275° F. at a pressure of 15 pounds per square inch for a minimum time of four hours. The temperature may vary from about 250° F. to about 300° F. and the pressure may vary from about 15 to about 20 pounds per square inch.

After the minimum four hour autoclaving step, the heat was discontinued and the autoclave and its contents were allowed to cool to near room temperature. The residual pressure was then released and the coal-solution mixture filtered to remove the solid matter, the filtrate then consisting of an acid solution useful alone as an electrolyte in acid storage batteries, as an additive to batteries containing an acid electrolyte, or in lieu of potash in storage batteries of the alkaline type. The coal extracts produced in accordance with the above method are believed to contain many organic acids including humic acids, carbocyclic benzenoid acids and aliphatic carbocyclic acids which provide the primary electrolytic properties when utilized in batteries as indicated.

Example 2

The process of this example was identical to that of Example 1, but two pounds of peat moss per gallon of water were substituted for the lignite coal.

Example 3

The process of this example was identical to that of Example 1 except that two pounds of peat coal per gallon of water were substituted for the lignite coal of that example.

As another aspect of this invention it has been discovered that mellitic acid, either alone or used in combination with the extracts produced in accordance with the above-described process, is an extremely valuable electrolyte for storage batteries. Additionally, I have found that a mellitic acid solution may be produced by the oxidation of coal and like materials.

Example 4

One part of finely ground (200 mesh) lignite coal was suspended in 24 parts by weight of nitric acid having a specific gravity of 1.5–1.52. A catalyst consisting of 0.2% by weight of vanadic acid (may vary from 0.2 to 0.5% by weight) was added and the suspension was refluxed for about 70 hours, cooled and an additional 24 parts of nitric acid was added. Refluxing was continued until the solution turned yellow, whereupon the nitric acid was distilled off until the residue was almost to dryness.

The residue was dried at 125° C. and was added to five liters of 4.0% potassium hydroxide solution. The resulting brown solution was slowly treated with potassium permanganate at reflux for 6–10 hours, cooled and the excess potassium permanganate removed with ethyl alcohol.

The mixture was then filtered free of manganese oxide with washing with hot distilled water, the filtrate concentrated and neutralized with nitric acid. The neutralized filtrate was heated and saturated barium chloride solution added thereto to form a precipitate of barium salts which were filtered off with washing. The filtrate was discarded. The precipitate was decomposed with a stoichiometric proportion of sulfuric acid and the mixture filtered to remove the barium sulfate. The filtrate was concentrated to incipient crystallization and the mellitic acid precipitated as the ammonium salt, cooled for one hour, and filtered. The precipitate was washed with cold ammonium hydroxide, converted to the lead salt which in turn was converted to mellitic acid. This mellitic acid, dissolved in distilled water in concentrations of from about 0.5 to about 10% by weight, is a highly satisfactory electrolyte for storage batteries, either alone or as additives to conventional electrolytes and electrolytes prepared in accordance with the basic process illustrated by Example 1 above.

The product of Example 4, while primarily mellitic acid, contains traces of pyromellitic acid, mellophanic acid, trimellic acid, benzoic acid, phthalic acid, and benzene pentacarboxylic acid. It may be prepared by the disclosed oxidation process, utilizing as a starting material graphite, charcoal, peat coal, bituminous coal, lignite coal or anthracite coal.

The electrolytes prepared by the processes of this invention may be used in a variety of storage batteries such as those which contain lead electrodes, zinc and copper electrodes, carbon and silver electrodes and in fact, cells with any of the electrodes in common use. It has been found that during use of the batteries which contain the organic electrolytes prepared in accordance with this invention, the acids are depleted and additions must be occasionally made. Preferably such additions are most conveniently made by the use of mellitic acid in small amounts.

Some of the advantages of electrolytes produced in accordance with this invention are as follows:

(1) Lamps burned by batteries which contain one of the electrolytes produce more candle power than the corresponding cells which contain only their ordinary sulfuric acid electrolyte or potash electrolyte.

(2) The number of ampere hours of sulfuric acid batteries or potash alkaline storage batteries is increased when one of the extracts prepared per Examples 1, 2 and 3, or the mellitic acid prepared per Example 4, is used in lieu of or added to the sulfuric acid in sulfuric acid batteries and used in lieu of potash in alkaline storage batteries.

(3) The mellitic acid solutions and water extracts do not possess the toxic and dangerous properties of potash mixtures or sulfuric acid concentrations present in such batteries that use potash or sulfuric acid mixtures.

(4) When used alone as an electrolyte in batteries, the water extracts and the mellitic acid reduce the "sulfating" and corroding of the plates in sulfuric acid batteries and alkaline potash batteries.

(5) An electrolyte prepared in accordance with this invention and used alone in a sulfuric acid battery or alkaline potash battery exhibits a tendency to regenerate the charge of the battery after the battery has been "drained" or discharged to a degree where it is momentarily inoperable.

(6) Mixtures of any two or all of the extracts prepared per Examples 1, 2 and 3 herein in any proportion produce results similar to any single extract when such mixtures are used in lieu of or in addition to the sulfuric acid in sulfuric acid batteries or when used in lieu of potash in alkaline storage batteries.

This is a continuation-in-part application based on my copending application Serial Number 373,907, filed August 12, 1953, now abandoned, on Electrolyte for Batteries.

While specific embodiments of this invention have been shown and described, it is not intended to limit the same to the exact details of the construction set forth, and it embraces such changes, modifications and equivalents of the parts and their formation and arrangement as come within the purview of the appended claim.

I claim:

A battery electrolyte containing from 0.5 to 10% by weight of mellitic acid in solution therein.

References Cited in the file of this patent

UNITED STATES PATENTS

| | | |
|---|---|---|
| 1,817,846 | Reinhardt | Aug. 4, 1931 |
| 2,119,213 | Kasehagen | May 31, 1938 |
| 2,176,348 | Juettner | Oct. 17, 1939 |
| 2,461,740 | Kiefler | Feb. 15, 1949 |

FOREIGN PATENTS

| | | |
|---|---|---|
| 692,454 | Great Britain | June 3, 1953 |

OTHER REFERENCES

Hackh's Chemical Dictionary, Ed. 3, page 415.